United States Patent [19]

Spivey

[11] 4,155,191
[45] May 22, 1979

[54] FISHING LURE WITH ADJUSTABLE BUOYANCY CONTROL

[76] Inventor: Arlie Spivey, 713 Bahama St., Palm Bay, Fla. 32905

[21] Appl. No.: 779,289

[22] Filed: Mar. 18, 1977

[51] Int. Cl.² .................................................. A01K 85/00
[52] U.S. Cl. .................................... 43/42.22; 43/42.31; 43/42.39
[58] Field of Search .................. 43/42.22, 42.31, 42.05, 43/42.06, 42.29, 42.35, 42.36, 42.47, 42.09, 42.39

[56] References Cited

U.S. PATENT DOCUMENTS

| 1,334,249 | 3/1920 | Lane | 43/42.22 X |
| 1,394,313 | 10/1921 | Leeper | 43/42.39 X |
| 1,489,043 | 4/1924 | Reinewald | 43/42.29 |
| 1,857,939 | 5/1932 | Cameron | 43/42.31 |
| 2,152,275 | 3/1939 | Parkins | 43/42.39 X |
| 2,563,282 | 8/1951 | Schenck | 43/42.22 |
| 3,044,207 | 7/1962 | Dorsett | 43/42.22 X |

Primary Examiner—Ronald E. Suter
Attorney, Agent, or Firm—Duckworth, Hobby, Allen & Pettis

[57] ABSTRACT

A fishing lure apparatus for plug or spin casting has an elongated body having a swivel shank on the front for attaching a fishing line and a spring clasp on the rear for attaching interchangeable tail portions. The elongated body has a hollowed-out belly having a slidable mass therein which in one position maintains the lure with air entrapped in the hollowed-out portion, so that the lure floats on the surface and in a second position, tilts the lure to let the air escape so that the lure dives. An adjustable wobble plate or lip helps control the depth of the dive and the wobble of the lure. A sliding belly cover to cover a portion of the opening to the hollow belly portion may be used to provide additional weight and better air entrapment.

4 Claims, 6 Drawing Figures

FISHING LURE WITH ADJUSTABLE BUOYANCY CONTROL

BACKGROUND OF THE INVENTION

The present invention relates to fishing lures and especially to those fishing lures for use in plug or spin casting. More specifically, the present invention relates to those fishing lures that by a simple adjustment can be made to either float on the water or dive.

In the past, a great variety of artificial fishing baits and lures have been available. Many of these prior art lures have attempted to imitate frogs, birds, bugs, flies, worms, and other live bait. These and other prior art lures have used propellers, spinners and wheel-type devices as well as wobble plates to produce motion in the water or sounds for attracting the attention of the fish, or imitating the motion of a live bait in the water. Many prior art lures are designed to float on and near the surface of the water while other prior art lures are specifically made to dive to the bottom or below the surface of the water. This is generally accomplished by the bouyancy of the lure, but it has also been suggested to have lips or spoons to catch the water as the lure is pulled through it to force the lure to dive as it is pulled through the water.

Typical prior art in this area includes the Peterson U.S. Pat. No. 3,874,109, which illustrates the lure having an adjustable point for connecting the line to adjust the balance of the lure along with an adjustable lip and ballast for controlling the path of the lure. The Smith U.S. Pat. No. 2,883,786, has adjustable surfaces along with an angled belly surface as does the Suick U.S. Pat. No. 2,525,733. The Knapton Lure illustrated in U.S. Pat. No. 3,205,609, has a detachable weight for adjusting the weight of the lure, while the Prieur lure in Pat. No. 2,598,012 has an angled forward body surface along with a line connection along the top portion of the lure. U.S. Pat. No. 3,044,207 to Dorsett, and Thurman, U.S. Pat. No. 2,718,725, illustrate lures having shiftable weights inside the lure body and U.S. Pat. Nos. to Poe, 2,944,363; Reynolds, 1,200,135; and Watts, 3,858,344, show patents having adjustable lips or surfaces to control the movement of the lure. The present lure, on the other hand, includes a weight that is shifted by the user to make the lure a floating or diving lure and includes an adjustable lip portion to control the depth of the dive, which features are combined with a shiftable hook and interchangeable tail portion, which through a simple spring action, allows tails of pork rind or other materials to be quickly attached to the lure.

SUMMARY OF THE INVENTION

The present invention teaches a fishing lure having an elongated body having a shape similar to a small bait fish and a hollowed-out belly portion which entraps air when the lure is cast onto the surface of water. The hollowed-out belly portion has a thin rod extending therethrough which is an extension of a swivel shank on the front of the lure. A sliding mass such as a split shot may be attached to the rod in the hollow space and may be shifted so that the lure is balanced to maintain the air entrapped in the hollow portion or may be slid to off-balance the lure to dip the head into the water and let the air escape from the hollow space and allow the lure to dive. The dive may be controlled by an adjustable lip on the front portion of the lure, and the lure has a spring attachment on the rear portion for attaching different tail portions to the lure to allow for a quick change in the lure for different types of fish. A sliding belly cover to cover a portion of the opening in the hollow belly may be used to provide additional weight and better air entrapment in a second embodiment.

BRIEF DESCRIPTION OF THE DRAWINGS

Other objects, features and advantages of the present invention will be apparent from the written description and the drawings in which.

DESCRIPTION OF THE PREFERRED EMBODIMENT

Figure 1:
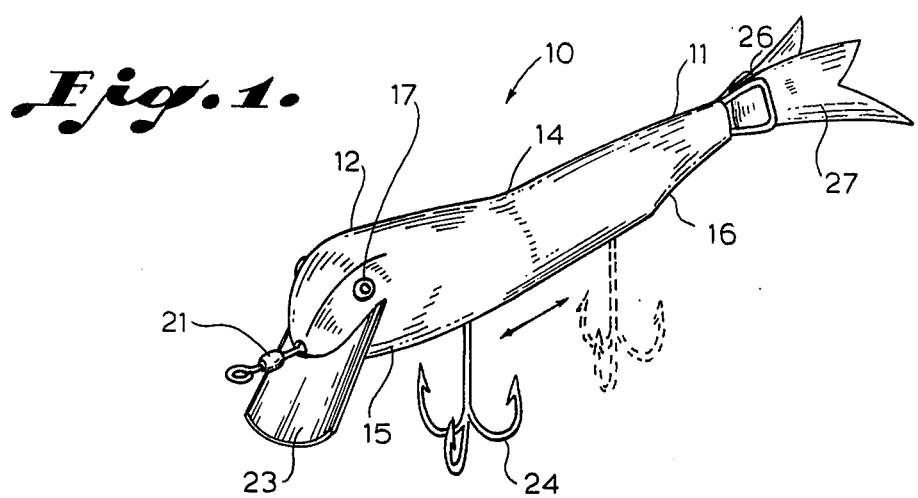
FIG. 1 is a perspective view of a fishing lure in accordance with the present invention.
Figure 2:
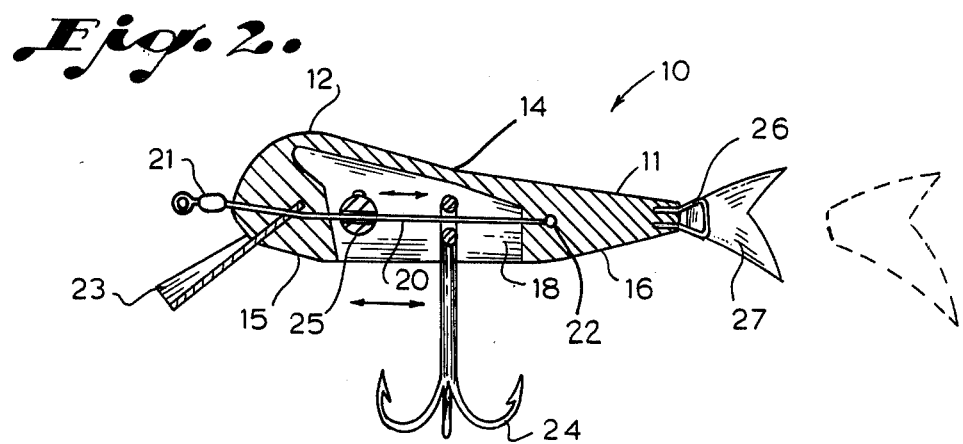
FIG. 2 is a side sectional view taken along the elongated axis of the lure of FIG. 1.
Figure 3:
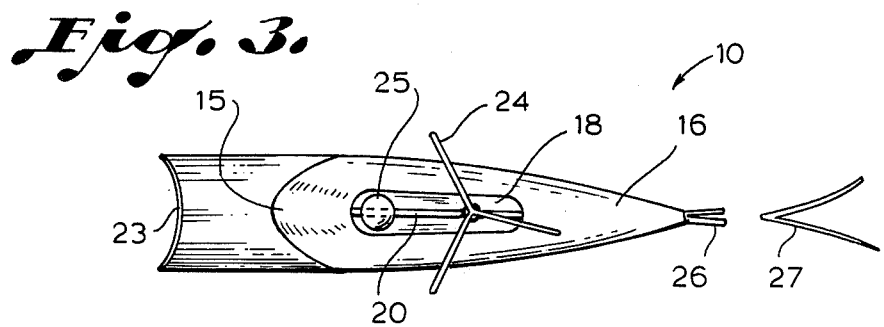
FIG. 3 is a bottom elevation view of the lure of FIGS. 1 and 2, with the changeable tail portion separated.

Referring now to FIGS. 1 through 3 of the drawings, a fishing lure having a body 10 has a body rear portion 11 and a body front portion 12 along with a belly side 13. The body has a top bend area 14 and a belly front angled surface 15 and a belly tail angled surface 16. The body also has a pair of eyes 17 attached to the front thereof and in addition, the body 10 has a hollowed belly portion 18 opened on the belly side. A center support rod 20 may be an extension of a swivel shank 21 which may extend through the front portion of the lure through the hollow portion 18 and be attached with a pin 22 in the rear portion of the lure. This center support rod 20 may be made of steel wire, or the like. The body 10 also has a lip or wobble plate 23 attached thereto which is made of an easily bendable metal such as aluminum so that a fisherman with a pair of needle-nose or fishing pliers can bend the wobble plate to make the lure wobble. The lip can also be bent to make the plate make a deeper dive. The center support rod 20 has a triple hook 24 attached thereto along with a slidable mass 25 which may be a split shot. The split shot is attached to a center support rod 20 in a manner that it can be slid back and forth but has sufficient frictional engagement with the center rod 20 that it will maintain its position during casting. Thus, the mass 25 can be positioned in the front portion of the hollowed-out portion 18 of the body 10 as illustrated in FIGS. 2 and 3, or it can be slid towards the rear portion of the hollowed-out portion 18 of the body 10. When the mass 25 is slid towards the rear, the lure is balanced so that when it is cast upon the water, the lure will sit on the water belly-down with the hook hanging downward and with air entrapped in the hollow space 18. As the lure is pulled along the water, it will act as a surface type lure. If the lure is shifted to the front as illustrated in FIG. 2, the hook 24 will also slide towards the front of the lure 10, the lure will tilt forward in the water, allowing the air in the hollow space 18 to escape, thereby reducing the bouyancy of the lure and allowing the lure to dive. In addition, the lip 23 can be adjusted for a medium or deep dive controlled by the speed of pulling the fishing line in. Having the center support rod 20 connected to the swivel shank 21 passing through the lip 23 and attached with a pin 22 strengthens the lure while providing support for the different elements. The lip 23 can also be bent in an asymmetrical manner to make the lure wobble in the water, either during diving or when acting as a surface lure.

The present lure has a dual spring clamp 26 attached to the tail portion 11 which can clamp on a shaped pork rind tail 27 or any shaped tail desired, and which thus allows a quick change of the tail portion to change the nature of the lure.

Figure 4:
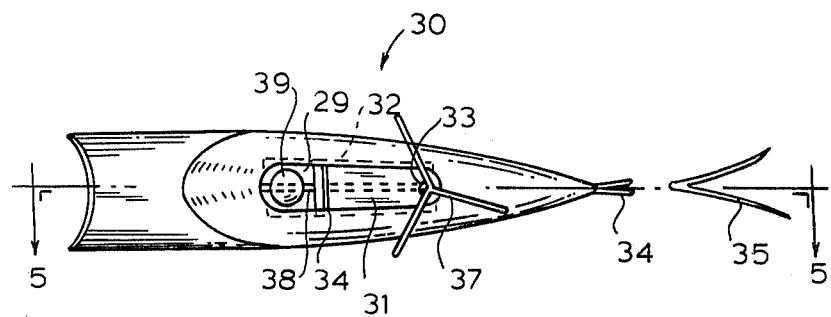
FIG. 4 is a bottom elevation of a second embodiment.
Figure 5:
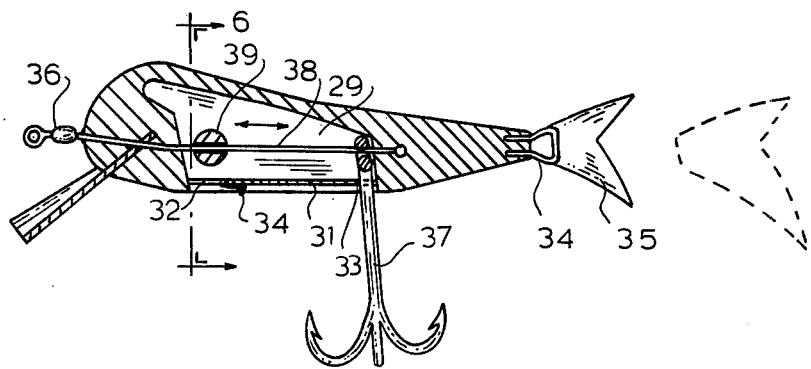
FIG. 5 is a side sectional view taken on the line 5—5 of FIG. 4.
Figure 6:
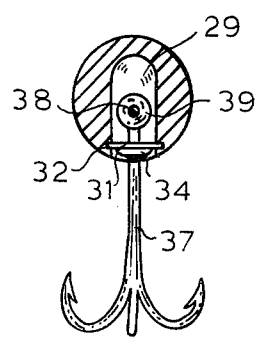
FIG. 6 is a sectional view taken along the line 6—6 of FIG. 5.

FIGS. 4, 5, and 6 illustrate a second embodiment having a body 30 shaped the same as shown in FIGS. 1, 2, and 3, except for the added belly cover 31 covering the hollow opening 29 which slides in grooves 32 in the lure body 30. The cover 31 has a hook notch 33 for the hook stem when the cover is in a back position as shown in FIG. 4. The cover 31 also has a protruding handle 34 to engage for sliding the cover 31 forward. The cover 31 prevents the escape of air and maintains the lure's floating balance in its rearward position but increases the tilt and allows air to escape in the forward position of FIG. 5. The cover 31 which may be made of metal also adds weight to the lure to improve casting. This embodiment also has a tail clamp 34, changeable tail 35, swivel 36, hook 37, center support rod 38, and a slidable weight 39.

It can be seen at this point that a single lure has the flexibility to be quickly changed from a surface lure to a medium or deep diving lure, to wobble or not, and with a variety of interchangeable tails to allow the fisherman with a single lure to fish for a variety of species of fish. The lure can also be decorated with different colors and surfaces as desired and may have additional hooks without departing from the spirit and scope of the invention. The lure has angled surfaces and a bouyancy factor which allows the lure to sink without entrapped air but float when the air is entrapped in the belly portion. The present invention is, accordingly, not to be construed as limited to the particular forms disclosed herein, which are to be regarded as illustrative rather than restrictive.

I claim:

1. A fishing lure comprising:
   an elongated body having a front and rear portion, and a belly portion, said belly portion having a hollowed area extending thereinto for entrapping air when said lure is cast on the surface of water;
   a slidable mass located in said hollowed portion, slidable between first and second positions, said first position balancing said lure body to keep air entrapped therein, when said lure is floating on water and said second position tilting said body towards said front portion to allow said entrapped air to escape and said lure to dive, when pulled through water whereby said lure can be made to float or dive by the shifting of said mass; and
   said elongated body having a slidable cover covering a portion of said hollow area in said body whereby added weight and improved entrapment of air are provided.

2. the fishing lure in accordance with claim 1, in which said slidable cover has a protruding handle for sliding said cover and said cover slides in grooves in said lure body.

3. The fishing lure in accordance with claim 1, in which said slidable cover has a hook notch to engage a hook stem when slid thereagainst.

4. The fishing lure in accordance with claim 1, in which said slidable cover has a first position to balance said lure and a second position for tilting said lure body to prevent the entrapment of air when pulled through water.

* * * * *